FLIP-FLOP WITH SIMULTANEOUSLY CHANGING SET AND CLEAR OUTPUTS

Filed Dec. 30, 1966

INVENTOR.
RONALD G. HINTZ
BY
Cushman, Darby & Cushman
ATTORNEYS

United States Patent Office 3,548,221
Patented Dec. 15, 1970

3,548,221

FLIP-FLOP WITH SIMULTANEOUSLY CHANGING SET AND CLEAR OUTPUTS

Ronald G. Hintz, St. Paul, Minn., assignor to Control Data Corporation, a corporation of Minnesota
Filed Dec. 30, 1966, Ser. No. 606,138
Int. Cl. H03k 3/12
U.S. Cl. 307—292 10 Claims

ABSTRACT OF THE DISCLOSURE

This invention relates to a flip-flop, the SET and CLEAR outputs of which simultaneously switch. A first AND circuit, the two inputs of which are respectively responsive to the data signal and the SET input gating pulse, is provided. Means responsive to the first AND circuit are provided to set the flip-flop (thereby placing the SET output terminal in the logical ONE condition) when the input conditions for the first AND circuit are satisfied. Means also responsive to the conditioning of the first AND circuit are provided to immediately place the CLEAR output in the ZERO condition simultaneously with the placing of the SET output to the ONE condition. Thus the SET ond CLEAR outputs are simultaneously switched. A second AND circuit is provided which is responsive to the CLEAR input gating pulse and the SET output signal causing the flip-flop to be cleared (that is, the CLEAR output be placed at the logical ONE condition and the SET output be placed at the logical ZERO condition) where, once again, the SET and CLEAR output terminals switch simultaneously and only one stage time after the initial occurrence of the SET and CLEAR input gating pulses.

This invention relates to an improved flip-flop where the SET and CLEAR outputs thereof are simultaneously switched.

Heretofore, in conventional flip-flops the SET and CLEAR outputs thereof would settle down in two or three stage times after the initiation of the SET triggering pulse, for example, with the CLEAR output settling down one or two stage times after the SET output settled down. This necessarily slows down the speed of operation of systems employing such flip-flops. For example, when general purpose computers perform the multiplication operation, a single register is iteratively employed to sequentially perform this operation. Since the multiplication circuitry senses both the SET and CLEAR outputs of each flip-flop of the register, the operation of this circuitry must wait the two or three stage times, mentioned above, before it can sense or strobe the data in the flip-flops. However, the improved flip-flop of this invention causes the SET and CLEAR outputs to change simultaneously, thereby making these outputs available only one stage time after the occurrence of the flip-flop triggering signal. It now can be seen that the improved flip-flop of this invention will speed up the operation of multiplication circuitry, since data is available from the register one stage time after it has been placed in the register.

Thus, it is a primary object of this invention to provide an improved flip-flop where the SET and CLEAR outputs change simultaneously one stage time after the initial occurrence of the triggering signal applied thereto.

A further object of this invention is to provide an improved flip-flop which may be employed in registers to increase the speed of operation of digital data processing equipment.

Referring to the prior art register mentioned above with respect to the multiplication operation, the data utilized in each of the iterations of the multiplication operation has to be cleared out of the register before the data associated with the next iteration can be placed in the register. The necessity of clearing out the register prior to transferring new data to it imposes critical timing requirements which are extremely difficult to meet in many applications.

It is a further object of this invention to provide an improved flip-flop which can be force set with only one register from the previous stage of logic without previously clearing the improved flip-flop thereby eliminating the criticality of timing requirements mentioned above.

Many applications call for a register to feed a logical network (adder, translator, etc.). Generally, both the SET and CLEAR outputs of the register feed the first rank of logic in the network. If the SET and CLEAR outputs do not switch simultaneously, spikes are propagated up through the logic. The width of these spikes is proportional to the difference between the SET and CLEAR outputs of the flip-flop. These spikes are eliminated by the improved flip-flop of this invention since the SET and CLEAR outputs change simultaneously as stated above.

Thus it is a further object of this invention to provide an improved flip-flop which eliminates spikes which may be propagated through a logic network fed from both the SET and CLEAR outputs of a register.

Other objects and advantages of this invention will become apparent upon reading the appended claims in conjunction with the following detailed description and the attached drawings, in which:

FIGS. 2A–2G illustrate various waveforms associated with the circuitry shown in FIG. 1.

Figure 1:
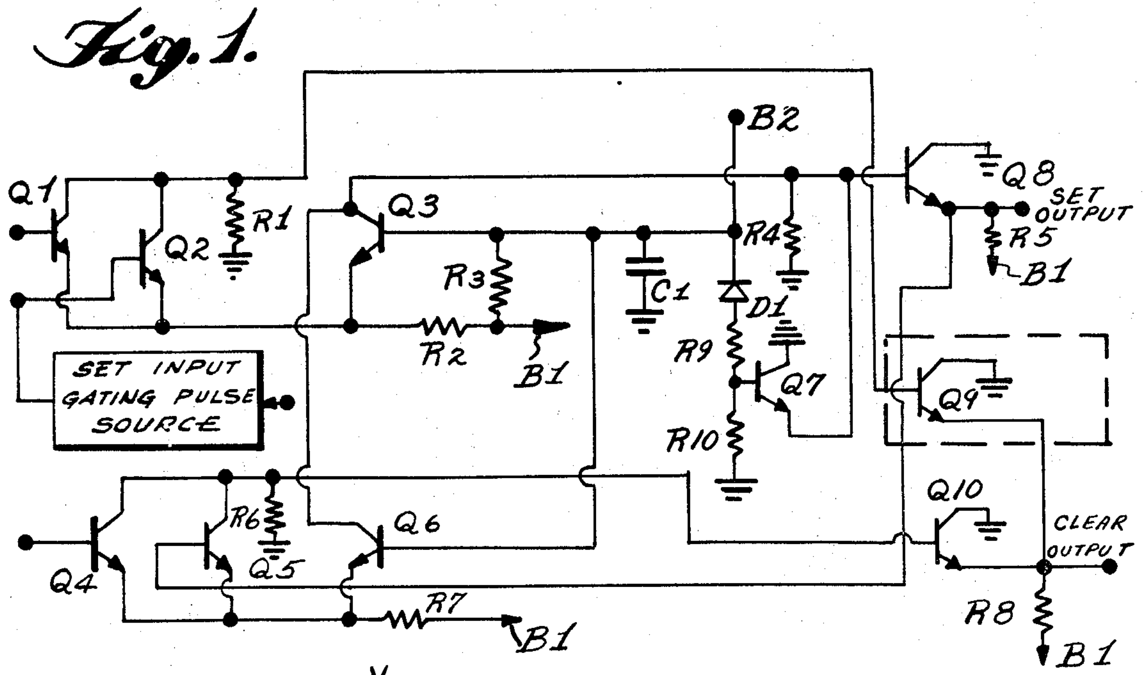
FIG. 1 is a schematic diagram of an illustrative embodiment of the invention.

Referring now to FIG. 1, there is shown an illustrative embodiment of the improved flip-flop in accordance with this invention. The SET input for the flip-flop comprises NPN transistors Q1 and Q2. These transistors comprise a first AND gate and when logical ONE's are applied to both outputs thereof, the flip-flop will be SET. The collectors of these transistors are connected to the base of emitter follower transistor Q9 from collector resistor R1 which is typically 90 ohms in value. Transistor Q9 is shown in dotted lines on the drawing because it is the addition of this transistor to the flip-flop which constitutes the invention. In the description of the operation of the flip-flop, which will be given hereinafter, it will be shown how the presence of Q9 brings about the desired simultaneous switching of the SET and CLEAR outputs of the flip-flop. Before going into this description of the operation of the flip-flop, the remaining structure thereof will first be described.

The SET input transistors Q1 and Q2 are connected to biasing source B1 which is for purposes of illustration, chosen to be −6 volts in value. Source B1 is connected to the emitters of transistors Q1, Q2 and Q3 through resistor R2 which is typically 400 ohms in value and to the base of transistor Q3 through resistor R3 which is typically 1000 ohms in value. The collector of Q3 is connected to the SET output terminal through emitter follower transistor Q8. Resistor R4 acts as the collector load for Q3, this resistor typically being 100 ohms in value. Resistor R5 acts as an emitter load for transistor Q8, its value typically being 500 ohms. R5 is also connected to −6 volts source B1.

Transistor Q4 acts as the CLEAR input for the flip-flop and together with transistor Q5 an AND circuit is established. The SET output is connected to the base of transistor Q5 to establish the flip-flop action of the circuit. Q4 and Q5 comprise a second AND gate and are connected to the CLEAR output terminal through emitter follower transistor Q10. The resistor R6 acts as a common collector load for Q4 and Q5 while the emitter load for Q4 and Q5 is Resistor R7 which is connected to −6 volts source B1. Typical values for R6 and R7 are 90 ohms and 400 ohms, respectively. Transistor Q6, together with transistor Q3, are connected to the SET output through transistor Q8. The emitter load for transistors Q9 and Q10 is R8 and typically its value is 500 ohms, it being connected to −6 volts source B1. Transistors Q9 and Q10 act as an OR circuit.

In order to provide a biasing potential for transistors Q3 and Q6, voltage source B2, which typically has a value of −2 volts, is connected to the bases of these transistors. Also provided is capacitor C1 which typically has a value of 450 pf. Transistor Q7 provides a clamping voltage on the base of Q8 and connected to the base thereof are diode D1, resistor R9 (which typically has a value of 89 ohms) and resistor R10 (which has typically a value of 39 ohms).

Figures 2A, 2B, 2C, 2E, 2F, 2G:
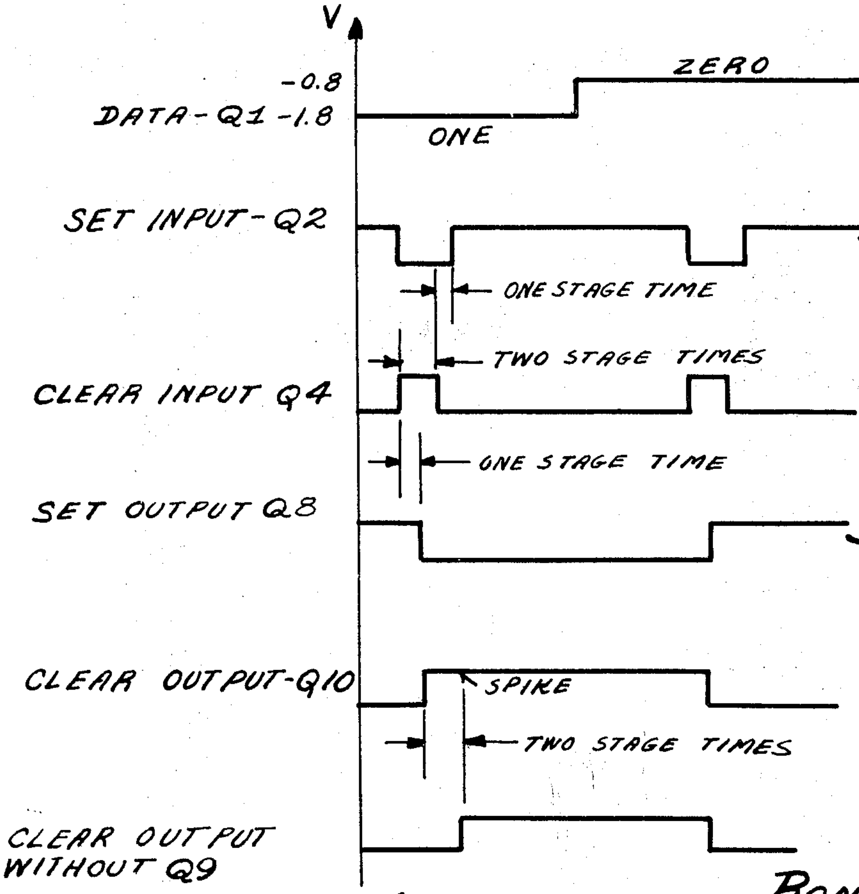

Reference should now be made to the timing diagram which comprises FIGS. 2A–2G. As shown in FIG. 2A, the data typically switches between −0.8 volt and −1.8 volts, these values respectively corresponding to logical ZERO and ONE. This also applies to the other waveforms shown in FIGS. 2B–2G. Further, the signals shown in FIGS. 2A–2G are related to one another time-wise as they would actually occur in an operating system. Thus, the signals in 2A–2G, taken together, comprise a timing diagram which illustrates the operation of the flip-flop.

FIG. 2A depicts data which is to be strobed into the flip-flop circuit. FIG. 2B shows SET input gating pulses which cause the flip-flop to be set with the data occurring in FIG. 2A. The signals shown in FIGS. 2A and 2B are respectively applied to transistors Q1 and Q2.

The signal shown in FIG. 2C corresponds to the CLEAR input gating pulse which clears the flip-flop and which is applied to transistor Q4 as indicated on the drawing. This waveform is typically derived from the same clock pulse source as the signal shown in FIG. 2B. However, note that the clock pulses interval between defining the leading and trailing edges of the signal shown in FIG. 2B is typically one stage time longer than the interval between the clock pulses defining the ends of the CLEAR pulse shown in FIG. 2C where the width of the CLEAR pulse corresponds to two stage times. The significance of the term "stage time" will become more apparent in the following description of the invention. Also, the significance of the wider width of the SET input gating pulse shown in FIG. 2B with respect to the width of the CLEAR input gating pulse shown in FIG. 2C will become apparent. Appropriate circuitry is connected to the input terminal for transistor Q2 for generating and coupling thereto a SET input gating pulse, see FIG. 1. The element labelled "set input gating pulse" in FIG. 1 is the source of the pulse shown in FIG. 2B.

The SET output signal is shown in FIG. 2E while the CLEAR output signal is shown in FIG. 2F. In FIG. 2G is shown the CLEAR output signal which would occur when transistor Q9 is not present. As can be seen, the SET and CLEAR outputs switch simultaneously one stage time after the SET and CLEAR input signals are applied to transistor Q2 and Q4, respectively. Whereas with transistor Q9 not present, the CLEAR output occurs three stage times after the occurrence of the SET and CLEAR input gating pulses and thus the SET and CLEAR outputs take longer to settle down with transistor Q9 not present.

In order to illustrate the importance of Q9's presence, the operation of the flip-flop circuitry, as shown in FIG. 1, will be described first with transistor Q9 not present. Then the description will be given with Q9 present to illustrate how it accomplishes the important objects and advantages discussed hereinbefore.

Referring to FIG. 2A, data is applied to transistor Q1, turning it off when the value of the applied data is −1.8 volts, which, as stated above, corresponds to logical ONE. When the SET input pulse is applied to Q2, it also turns off, thereby satisfying the input conditions for the AND gate and causing the emitter of Q3 to drop toward the −6 volt source B1. This causes Q3 to turn on since its base-emitter junction becomes forward biased. Thus, the base of transistor Q8 tends to go negative turning it off and causing a −1.8 volt signal (logical ONE) to occur at the emitter thereof. The emitter of Q8 settles at −1.8 volts because of the load (not shown) connected to the SET output terminal.

Hence, the SET output drops to logical ONE as shown in the timing diagrams. Further, the transition takes place one stage time after the initial occurrence of the SET input signal shown in FIG. 2B because of the amount of time required to turn transistors Q2 and Q8 off, the amount of time required to turn Q3 on being negligible.

At the same time that the SET input gating pulse is applied to transistor Q2, the CLEAR input gating pulse is applied to transistor Q4. This causes Q4 to be turned on, thereby causing a negatvie going signal to be applied to Q10, thereby tending to keep the CLEAR output at the logical one level corresponding to −1.8 volts. Thus the CLEAR output cannot occur until both Q4 and Q5 have been turned off. Q5 will be turned off one stage time after the initial occurrence of the CLEAR input gating pulse, as indicated by FIG. 2E, that is, as soon as the SET output goes negative, it will be coupled to the base of the Q5 to turn this transistor off. However, Q4 will not be turned off until the CLEAR input returns to the logical one level as shown in FIG. 2C. When this occurs, both Q4 and Q5 have logical ONES applied thereto and thus the input conditions for the CLEAR input AND gate are satisfied and the voltage at the base of transistor Q10 tends to rise toward ground with the emitter thereof settling at −0.8 volt which, of course, corresponds to logical ZERO. Hence, as can be seen in FIG. 2G, the CLEAR output from the flip-flop without transistor Q9 present does not occur until three stage times after the initial occurrence of the CLEAR input signal or one stage time after the termination of this signal. This one stage time corresponds to the amount of time required to turn transistor Q4 off after the CLEAR input signal terminates.

Heretofore, in the prior art this problem was overcome to some extent by causing the CLEAR input gating pulse to be applied to Q4 before the SET input signal was applied to Q2. However, when timing requirements are extremely critical, as they are in many high speed data processing operations, the application of the CLEAR input gating pulse to Q4 prior to the application of the SET input pulse to Q2 has not always been a satisfactory solution to the problem. Further, when this prior art approach is employed, the SET and CLEAR output signals do not switch simultaneously. Hence, the output circuitry which senses the CLEAR and SET outputs of the flip-flop must still wait until both of these outputs have settled down, slowing down the overall speed of the system.

The description of the system operation with transistor Q9 present will now be given. As stated before, the presence of this transistor causes the SET and CLEAR outputs to simultaneously switch while at the same time permitting the SET and CLEAR gating pulses to be applied to the flip-flop simultaneously as shown in FIGS. 2B and 2C. First, referring to the SET input, the transistors Q1 and Q2 are both turned off when the data signal and SET input gating pulse are both logical ONE as shown in the left portion of FIGS. 2A and 2B. This causes Q3 to be turned on and Q8 to be turned off, as stated hereinbefore. Thus, the SET output occurs as shown in FIG. 2E.

At the same time, a positive going signal will occur across collector load resistor R1 of transistors Q1 and Q2. This positive going signal is applied to the CLEAR output through emitter follower transistor Q9 across resistor R8. Since the logical ZERO is immediately established at the CLEAR output, as shown in FIG. 2F, there is no need to wait for the CLEAR input gating pulse at the base of Q4 to return to ONE as described hereinbefore with respect to the operation of the flip-flop with transistor Q9 not present.

As mentioned hereinbefore, the pulse width of the SET input gating pulse applied to Q2 is typically one stage time longer than the CLEAR input gating pulse applied to Q4. Hence, the SET input gating pulse will keep the CLEAR output at logical ZERO until the CLEAR input gating pulse terminates, at which time the CLEAR input gating pulse will maintain the CLEAR output at logical ZERO when the SET input gating pulse disappears. Since approximately one stage time is required to turn Q4 off, as discussed hereinbefore, the added pulse width of the SET input gating pulse with respect to the CLEAR input gating pulse width is required.

When a logical ZERO of data is to be placed into the flip-flop through Q1, the second SET and CLEAR input gating pulses shown in the right portion of FIGS. 2B and 2C respectively are applicable, these pulses occurring at the same time as the logical ZERO data. The CLEAR input gating pulse causes transistor Q4 to be turned on. This, in turn, causes the emitter of transistor Q6 to rise toward ground, which thereby turns transistor Q6 off and causes the base of Q8 to rise toward ground thereby turning Q8 on and by emitter follower action causing the SET output to rise to −0.8 volt which corresponds to logical ZERO, see FIG. 2E. Thus, the SET output is established one stage after the initial occurrence of the CLEAR input gating pulse. Also because Q4 is turned on, a negative going signal is applied to the base of Q10 which turns it off and causes the CLEAR output to drop to logical ONE as shown in FIG. 2F, this also occurring one stage time after the initial occurrence of the SET input gating pulse and simultaneously with the SET output signal.

There is a tendency for a small spike to occur in the CLEAR output signal, as shown in FIG. 2F. This results from the presence of transistor Q9. However, it has been established that the presence of this pulse is dependent upon the physical separation between transistors Q9 and Q10. Although it is doubtful that the occurrence of this spike would be particularly harmful, it is felt that with the use of integrated circuit techniques, its presence can be substantially eliminated because the physical separation between Q9 and Q10 will then be reduced to an absolute minimum.

Of course, rather than employing the NPN transistors shown in the drawing, PNP transistors may also be used with appropriate changes in bias voltage supplies.

Numerous other modifications of the invention will become apparent to one of ordinary skill in the art upon reading the foregoing disclosure. During such a reading, it will be evident that this invention has provided unique circuitry for accomplishing the objects and advantages herein stated. Still other objects and advantages, and even further modifications will be apparent from this disclosure. It is to be understood however, that the foregoing disclosure is to be considered exemplary and not limitative, the scope of the invention being defined by the following claims:

What is claimed is:

1. A flip-flop for storing a data signal where the SET and CLEAR output terminals thereof simultaneously settle down a predetermined time after the initial occurrence of SET and CLEAR input gating pulses for said flip-flop, said flip-flop comprising:
- a first AND circuit having inputs respectively responsive to said data signal and said SET input gating pulse;
- means responsive to said first AND circuit for placing said SET output terminal in the ONE condition;
- a second AND circuit having inputs respectively responsive to said CLEAR input gating pulse and the SET output signal;

- an OR circuit having two inputs, one input of which is responsive to said first AND circuit for placing said CLEAR output of terminal in the ZERO condition simultaneously with the placing of said SET output terminal in the ONE condition and the second of said two OR circuit inputs being responsive to said second AND circuit for maintaining said CLEAR output terminal in the ZERO condition when said SET input gating pulse terminates.

2. A flip-flop as in claim 1 including means responsive to said second AND circuit for placing said SET output terminal in the ZERO condition when the input conditions for said first AND are not satisfied.

3. A flip-flop as in claim 1 where said OR circuit includes a pair of emitter follower transistors and the CLEAR output terminal is located at the emitters of said transistors.

4. A flip-flop as in claim 3 where said first AND circuit includes a first parallel pair of transistors, the collectors of which are connected to one of the emitter follower transistors of said OR circuit and the bases of which are respectively connected to said SET input gating pulse and said data signal.

5. A flip-flop as in claim 4 where said second AND circuit includes a second parallel pair of transistors, the collectors of which are connected to the base of one of said OR circuit transistors and the bases of which are respectively connected to the said CLEAR input gating pulse and the SET output signal.

6. A flip-flop as in claim 1 where said SET and CLEAR output terminals switch one stage time after the initial occurrence of the SET and CLEAR gating pulses.

7. A flip-flop for storing a data signal where the SET and CLEAR output terminals thereof simultaneously settle down a predetermined time after the initial occurrence of SET and CLEAR input gating pulses for said flip-flop, said flip-flop comprising:
- means for generating a SET input gating pulse of a width greater than the width of the CLEAR input gating pulse;
- means responsive to said data signal and said SET input gating pulse for placing said SET output terminal in the ONE condition;
- means also responsive to said SET input gating pulse and said data signal for placing said CLEAR output terminal in the ZERO condition substantially simultaneously with the said placing of the SET output terminal in the ONE condition; and
- means responsive to the termination of said CLEAR input gating pulse for maintaining said CLEAR output terminal in the ZERO condition when said SET input gating pulse terminates.

8. A flip-flop, as in claim 1, where said SET pulse generating means is adapted to generate a pulse of a width that is approximately one stage time longer than the pulse width of said CLEAR input gating pulse.

9. A flip-flop, as in claim 1 including means for generating a SET input gating pulse which is of a width with respect to said CLEAR input gating pulse so that said CLEAR output terminal will be maintained in the ZERO condition.

10. A flip-flop for storing a data signal where the SET and CLEAR output terminals thereof simultaneously settle down a predetermined time after the initial occurrence of SET and CLEAR input gating pulses for said flip-flop, said flip-flop comprising:
- means including a first AND circuit responsive to said data signal and said SET input gating pulse for placing said SET output terminal in the ONE condition;
- means also responsive to said SET input gating pulse and said data signal for placing said CLEAR output terminal in the ZERO condition substantially simultaneously with the said placing of the SET output terminal in the ONE condition; and means responsive to the termination of said CLEAR input gating pulse for maintaining said CLEAR output terminal in the ZERO condition when said SET input gating pulse terminates.

References Cited

UNITED STATES PATENTS

| | | | |
|---|---|---|---|
| 2,945,965 | 7/1960 | Clark | 307—291 |
| 3,178,584 | 4/1965 | Clark | 307—291 |
| 3,284,645 | 11/1966 | Eichelberger et al. | 307—291 |
| 3,309,529 | 3/1967 | Bates et al. | 328—196 |
| 3,339,089 | 8/1967 | Bergman | 307—289 |
| 3,351,778 | 11/1967 | Seelbach et al. | 307—291 |
| 3,403,266 | 9/1968 | Heuner et al. | 307—293 |
| 3,424,928 | 1/1969 | Priel et al. | 307—289 |

DONALD D. FORRER, Primary Examiner

J. D. FREW, Assistant Examiner

U.S. Cl. X.R.

307—289, 297